Figure 1:
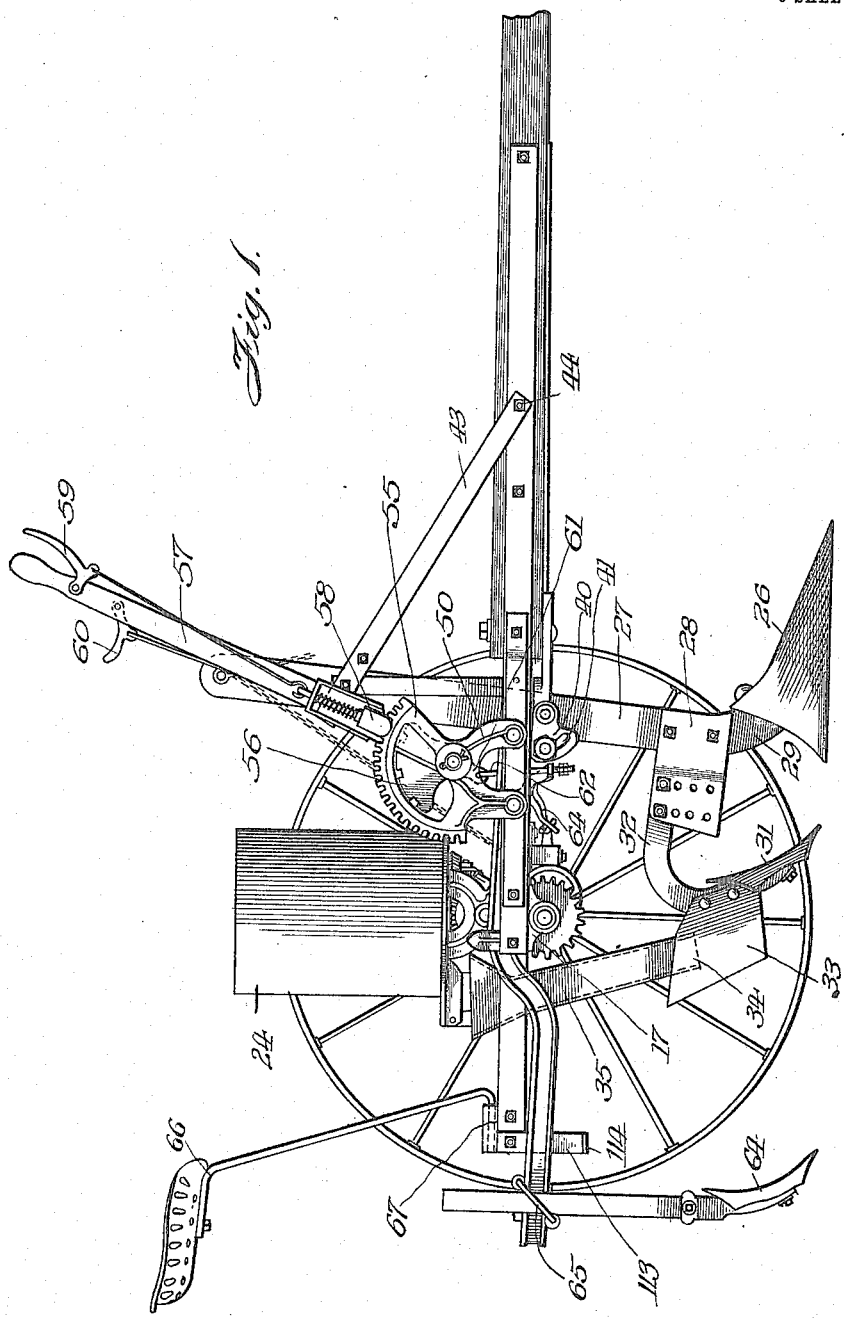

W. E. JOHNSON.
COTTON PLANTER.
APPLICATION FILED SEPT. 12, 1908.

1,131,245.

Patented Mar. 9, 1915.
6 SHEETS—SHEET 1.

Witnesses:

Inventor:
William E. Johnson
By Buckley Durand Drury
Att'ys

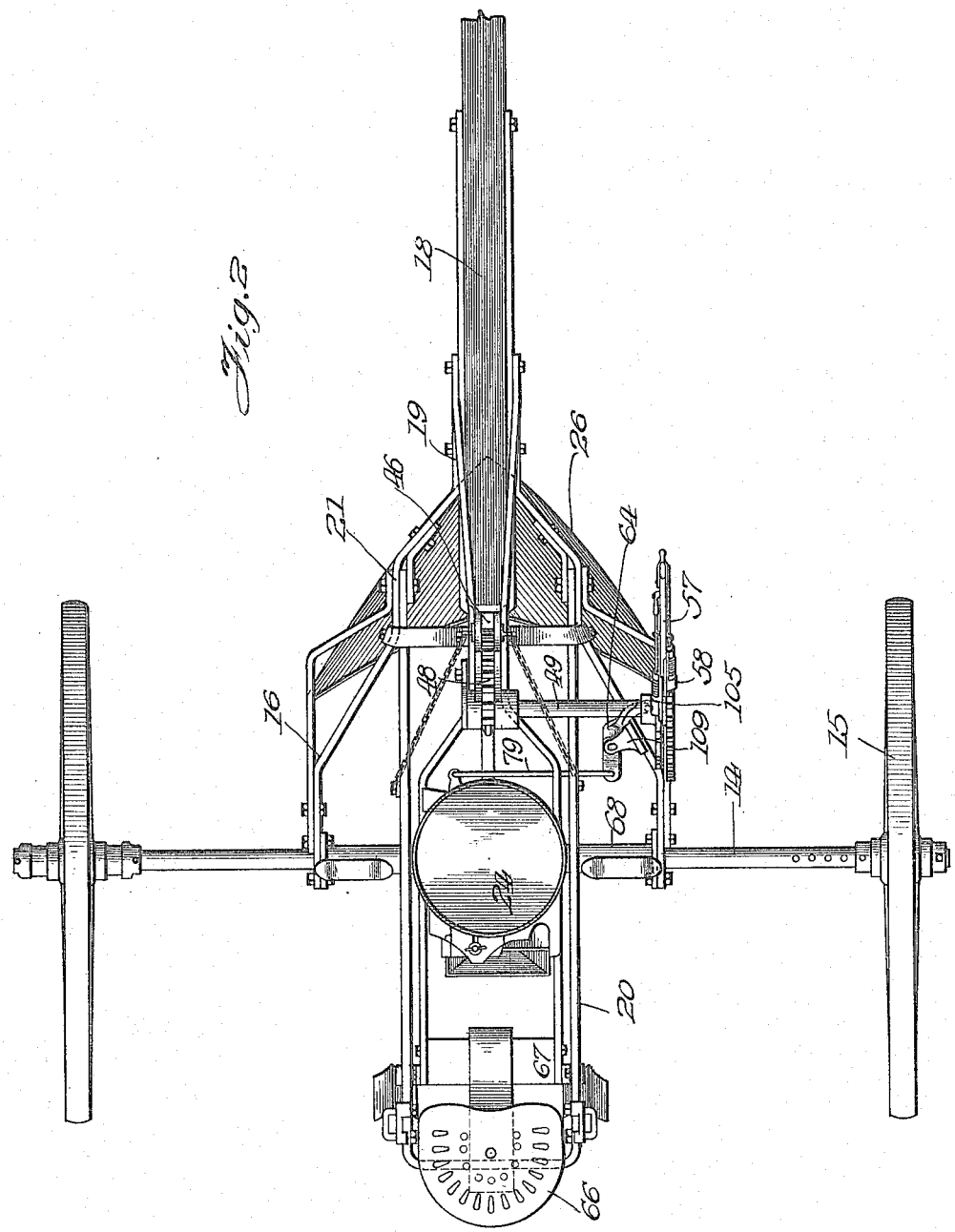

W. E. JOHNSON.
COTTON PLANTER.
APPLICATION FILED SEPT. 12, 1908.
1,131,245.
Patented Mar. 9, 1915.
6 SHEETS—SHEET 3.
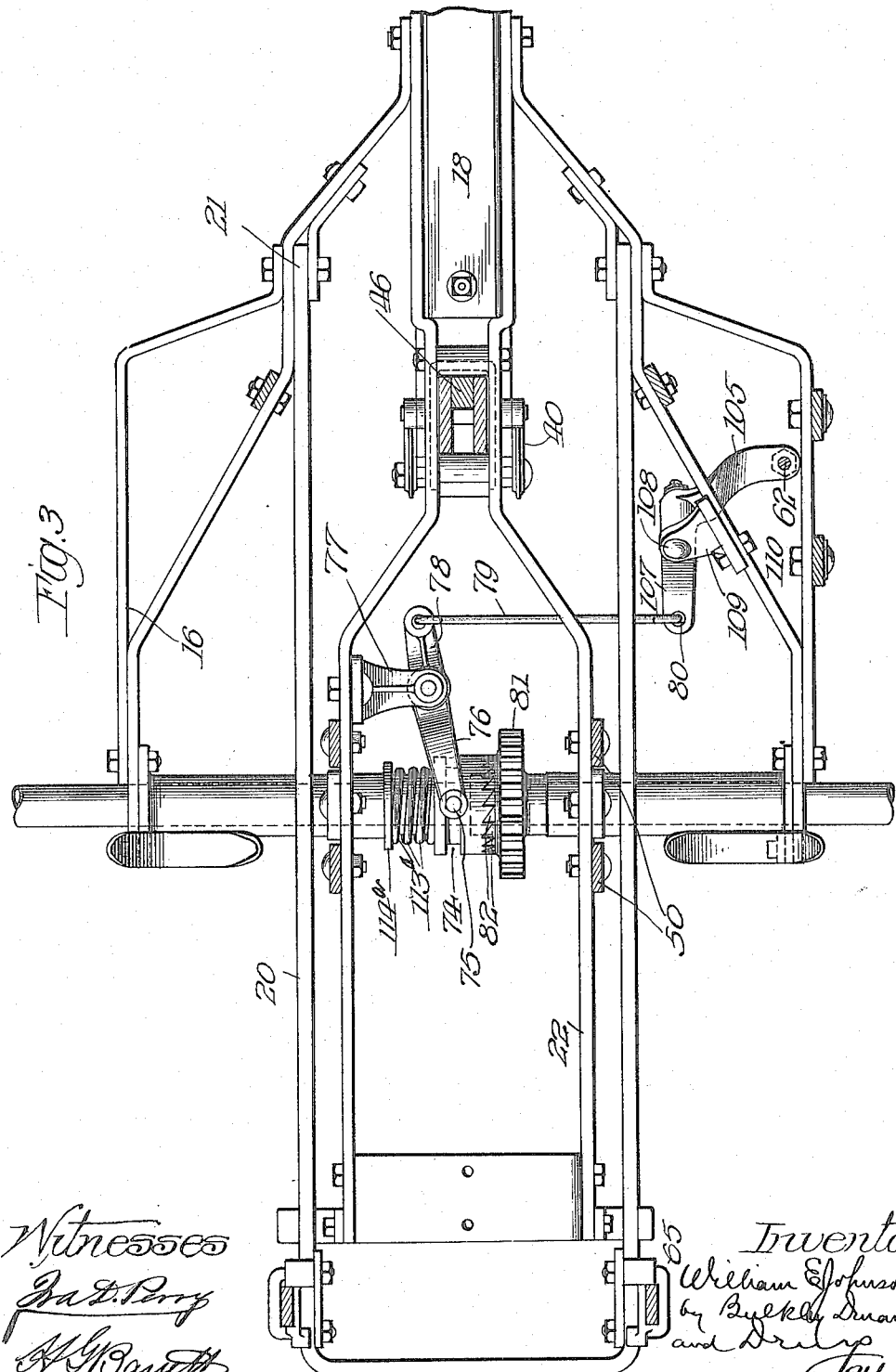

W. E. JOHNSON.
COTTON PLANTER.
APPLICATION FILED SEPT. 12, 1908.
1,131,245.
Patented Mar. 9, 1915.
6 SHEETS—SHEET 4.
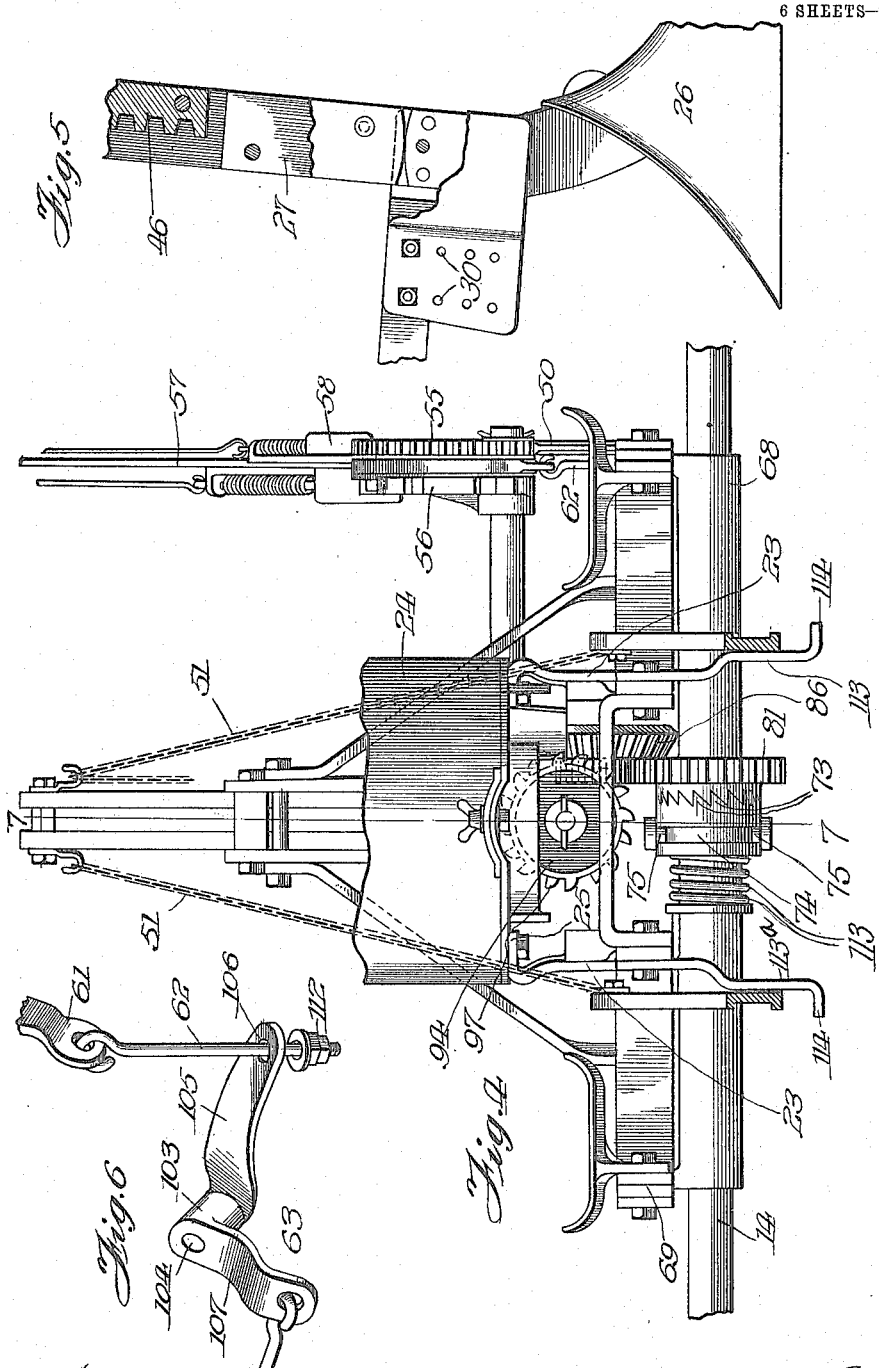

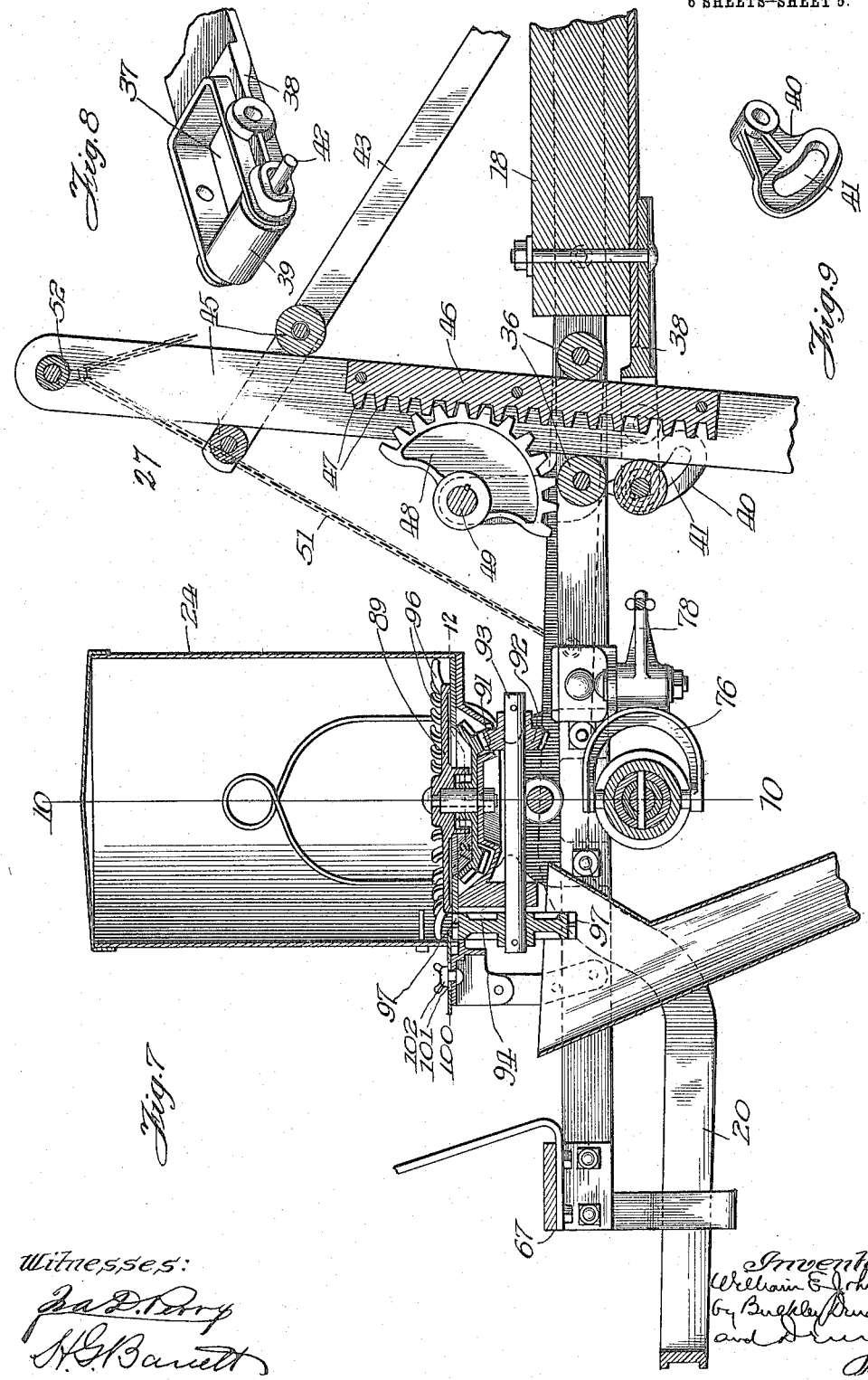

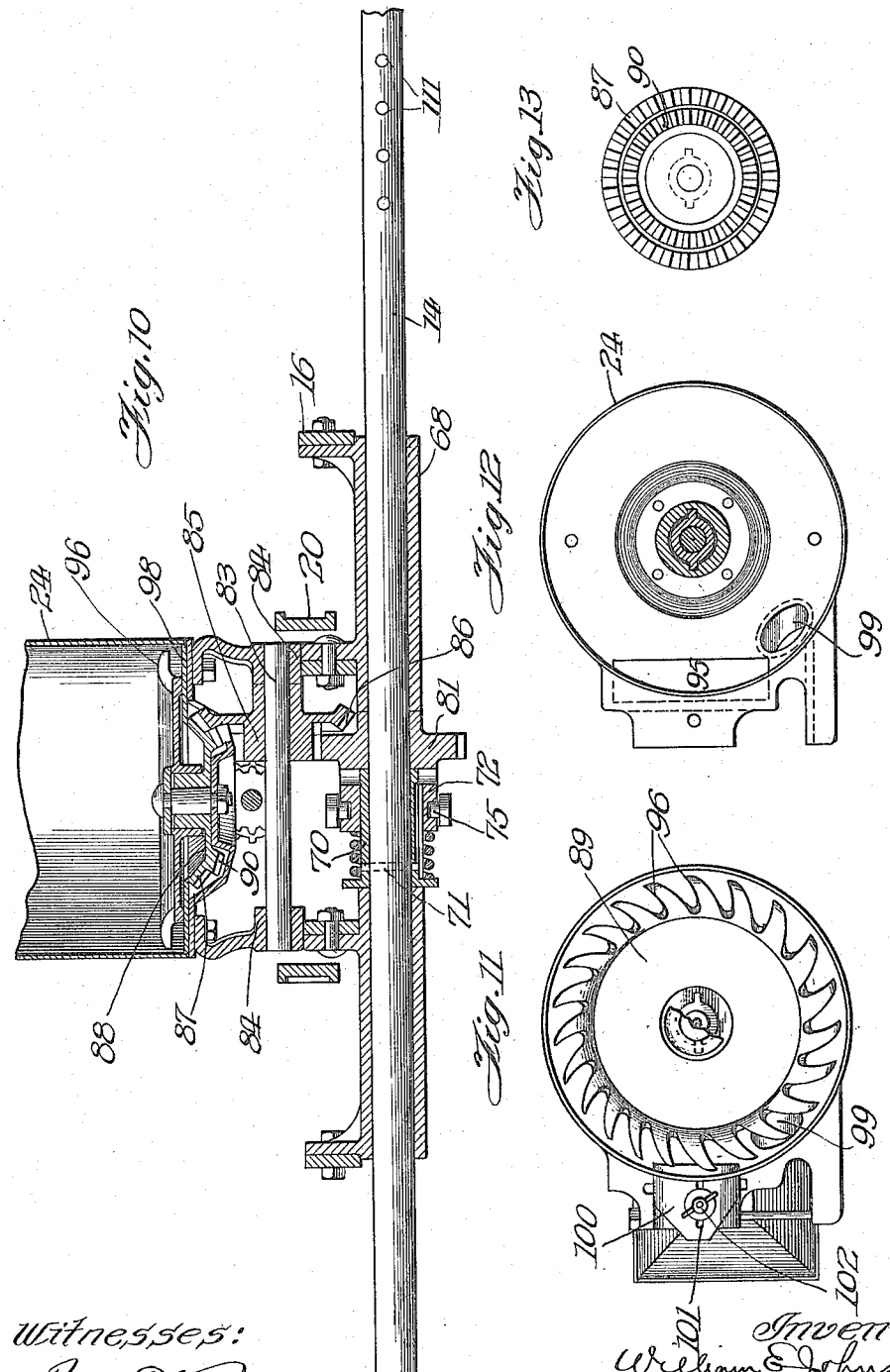

UNITED STATES PATENT OFFICE.

WILLIAM E. JOHNSON, OF ROCK ISLAND, ILLINOIS, ASSIGNOR TO ROCK ISLAND PLOW COMPANY, OF ROCK ISLAND, ILLINOIS, A CORPORATION OF ILLINOIS.

COTTON-PLANTER.

1,131,245.   Specification of Letters Patent.   Patented Mar. 9, 1915.

Application filed September 12, 1908. Serial No. 452,801.

*To all whom it may concern:*

Be it known that I, WILLIAM E. JOHNSON, a citizen of the United States of America, and resident of Rock Island, Illinois, have invented a certain new and useful Improvement in Cotton-Planters, of which the following is a specification.

My invention relates to improvements in cotton planters, and has for its object the production of a machine in which seed boxes are so mounted on a frame as to tie the sides rigidly together and the seed discharging mechanism is thrown into or out of engagement when the plow is lowered into or raised out of the ground.

A further object is the production of certain improved means for operating a clutch mechanism for throwing said seed dropping mechanism into and out of operative relation.

A further object is the improvement in the general construction of the machine whereby a stiffer and more substantial structure is produced.

These and other objects and improvements in the details of construction, which will more fully appear in the specification, are attained by my device, embodiments of which are illustrated in the accompanying drawings, in which—

Figure 1 represents a side elevation of my device. Fig. 2 represents a top plan view of Fig. 1. Fig. 3 represents an enlarged plan view of a portion of Fig. 2 with parts removed. Fig. 4 represents an enlarged end view of a portion of Fig. 2 from the rear. Fig. 5 represents an enlarged detail of a portion of Fig. 1, partly broken away. Fig. 6 represents a perspective view of the shifting casting. Fig. 7 represents a sectional view on the line 7—7 of Fig. 4. Fig. 8 represents a perspective view of the guiding bar. Fig. 9 represents a perspective view of the ears. Fig. 10 represents a sectional view on the line 10—10 of Fig. 7. Fig. 11 represents a plan view of the seed box and adjustment. Fig. 12 represents a sectional view on the line 12—12 of Fig. 7. Fig. 13 represents a bottom plan view of the seed box gearing.

Like numerals of reference indicate like parts in the several figures of the drawings.

Referring now to the drawings, 14 represents the main axle, on the ends of which are supporting wheels 15. The main frame 16 is mounted on the axle 14 and secured to a pole or tongue 18 at 19. The covering shovel frame 20 is preferably of yoke form and pivotally secured to the main frame at 21. The seed box frame 22 is mounted on the axle, and brackets 23 are secured thereto and to the under side of the seed box 24 at 25; the seed box and frame being rigidly held together. A plow or furrow opener 26 is mounted on the lower end of a bar or standard 27 and an attaching plate 28 is bolted on both sides of the plow support 29 and provided with a plurality of bolt holes 30. A sub-soiler 31 is mounted on a support 32, which is adapted to be rigidly secured to the plate 28. A head or guide 33 is also bolted to the support, within which the lower end 34 of the spout 35 projects. The bar 27 is mounted for vertical movement and passes between the rolls 36—36 mounted behind the tongue on the frame 22 and through an opening 37 in a casting 38 mounted on the rear end of the tongue. A roll 39 is also mounted in said casting on which the bar 27 slides. Adjusting castings or ears 40, provided with slotted ways 41, within which the journals 42 of the rolls 39 may move, are mounted on the casting. A pair of brace bars 43 are also bolted to the tongue at 44 and provided with a pair of rolls 45 through which the upper end of the bar 27 passes, thus insuring a substantially vertical movement of the bar when its position is shifted. A movement of the bar 27 is effected through the means of a rack bar 46 secured thereto, provided with teeth 47 and a pinion 48 mounted on a rock shaft 49 mounted on the frame 22 by means of brackets 50. Chains 51 are secured near the top of the bar at 52 and at the lower end to the shovel frame 20 so that the raising of the bar vertically also raises the covering shovels out of the ground. This adjusting casting 40 proves very effectual in taking up all slack movement or wear in the large standard or bar 27, and serves to maintain the bar in a rigid position at all times. The movement of this bar, carrying with it the plow and sub-soiler, is effected as follows: Mounted on the shaft 49 and rigid with the frame is a rack bar 55, and a second rack bar 56 is also mounted on the frame adjacent to the rack 55 and secured thereto. A lever 57 is mounted on the shaft 49 and a spring dog 58 controlled by a latch 59 permits the locking of the lever in the rack 55, while a second dog controlled by a latch 60 permits the locking of the lever to the rack 56. The lever 57 is provided with a downwardly projecting lug or extension 61, to the end of which is secured a link 62, on the lower end of which is mounted a shifting casting 63, which will be fully described later.

On the rear of the frame 20 are mounted covering shovels 64 following the sub-soiler 31 and adjustably secured at 65, as shown in Fig. 1. A seat 66 is mounted on the frame 22 at 67.

At the rear of the main frame are mounted a pair of hangers 113 bolted to the outside of the inside frame bars and extending downwardly and provided with outwardly extending feet 114 forming lugs for the covering shovel frame to rest in or on when the shovels are in the ground. This construction greatly stiffens the covering shovel frame against lateral movement and strain when the shovels are in the ground.

Referring now to Figs. 3, 4, 7 and 10, the main shaft passes through a sleeve 68 rigidly secured to the frame at 69. A sleeve 70 is keyed to the shaft 14 at 71, and a collar 72 is keyed thereon and provided with a toothed or ratchet face 73. This collar is provided with a circumferentially guiding slot or way 74 extending about its outer face and adapted to receive a pair of ears or pins 75 on a yoke arm 76. This yoke arm is pivotally mounted on a bracket 77 secured to the frame 22, and also provided with an extending projection or ear 78, to which is attached a rod or link 79. The other end of this link is attached to the shifting lug 63 at 80. This yoke arm and extension forms a bell crank lever, by means of which the collar 72 may be shifted along the sleeve 70. A spur gear 81 is mounted loosely upon the shaft 14 against the sleeve 70 and is provided on its inner face with teeth 82 adapted to engage the teeth on the collar 72. Above the main shaft 14 is mounted an operating shaft 83 in bearings 84 on the bracket supporting the seed box. A double gear wheel 85 is mounted on this shaft, the horizontal gearing of the wheel meshing with the pinion on the gear wheel 81 and the bevel gearing 86 meshing with the bevel pinion 87 on a gear plate 88 at the bottom of the seed box. This gear plate is rigidly connected to a toothed separating plate 89 within the seed box. This gear plate is also provided with a second beveled gear 90 meshing with a bevel gear 91 on a wheel 92 keyed on a picker shaft 93. On the opposite end of this shaft is keyed a picker-wheel 94 revolving within the well 95 and extending upwardly within the seed box just below the teeth 96 on the plate 89. This picker-wheel is provided with teeth 97 adapted to engage the seed on a plate 89 between the teeth 96 and carrying them into a position to be dropped through an opening 99 and into the spout 35. A plate 100, having a slot 101, and a thumbnut 102 is provided, by means of which the amount of seed discharged may be regulated. It will thus be seen that if the planter is moving forward the seed dropping mechanism is operated continuously and the seed dropped into the ground. It often becomes desirable when turning corners at the ends of rows, or at other times when moving forward, to shift the seed discharging mechanism to stop the discharge of seed. This is effected by the use of the shifting casting 63 heretofore mentioned, which will now be described in detail.

Referring now to Figs. 3 and 6, the shifting casting 63 comprises a barrel 103 provided with a hole 104. A wing 105 projects through the lower end of the barrel 103 and is provided with a hole 106, while a second wing 107 extends from the upper end of the barrel and at substantially right angles to the wing 105 and is also provided with a hole 106. A bolt 108 passes through the barrel and secures the shifter to the bracket 109 which is bolted to the frame at 110. The main axle 14 is provided with a plurality of holes 111, by means of which the wheels may be shifted on the axle.

Referring now to the operation of the shifting casting 63, it will be noted that this casting is kept on the link 62 by means of a stop nut 112 on the lower end of the link. When the lever 57 is thrown rearwardly, the ear 61 moves forwardly; the connections with the shifter being so adjusted that there is no appreciable movement of the shifter until near the end of the stroke. At this time the lost motion is all taken up and the wing 105 is pulled forward causing the shifter to turn on the pivot 108. This movement is transmitted through the wing 107 and link 79 to the bell crank lever 76 pivotally mounted on the bracket 77. This throws the collar 72 against the spring 113$^a$ compressing it against a shoulder 114$^a$ and the teeth 73 are then out of engagement with the teeth 82, thus disengaging the seed dropping mechanism. It will thus be noted that this action insures the planting of the seed while the plow is in the ground and automatically stops the seed dropping mechanism as soon as the plow is fully raised. The fact that the seed box is rigidly mounted on the frame through the medium of either brackets or plates gives much greater rigidity of construction than in the structure in which the top of the seed box is lifted off the gearing. The use of the double rack permits the greater vertical movement of the plow and sub-soiler, the head 33 surrounding the spout 35 as the sub-soiler is raised.

The implement as a whole is compact and rigid and the movable portions thereof are capable of ready and accurate adjustment.

I claim:

1. In a cotton planter, a frame, a plow or furrow opener, a vertically movable standard for supporting said plow, a bearing in said frame for said standard, and an adjustable casting secured to said frame and bearing against said standard to take up the wear on said standard.

2. In a planter, seed dropping mechanism, a furrow opener, a transversely disposed shaft for operating said mechanism, and means for automatically disengaging said seed dropping mechanism from said shaft, said means including a raising lever for said furrow opener, a clutch, a series of levers having one end connected to said clutch and the other end loosely connected to the clutch member lever raising lever.

3. In a planter, seed dropping mechanism, a furrow opener, a transversely disposed shaft for operating said mechanism, and means for automatically disengaging said seed dropping mechanism from said shaft, said means including a raising lever for said furrow opener, a clutch member, a lever connected to said clutch member, a bell crank lever loosely connected to said raising lever, and a connection between said lever and bell crank lever.

4. In a planter, seed dropping mechanism, a furrow opener, a transversely disposed shaft for operating said mechanism, and means for automatically disengaging said seed dropping mechanism from said shaft, said means including a raising lever, a clutch member, a bell crank lever provided with a hole in one arm and a pin secured to said raising lever passing through said hole to thereby loosely connect said raising lever with said bell crank, and connections from the other arm of said bell crank lever to said clutch.

Signed by me at Rock Island, Illinois, this 24th day of August, 1908.

WILLIAM E. JOHNSON.

Witnesses:
H. B. FRENIER,
H. DREYENS.

Copies of this patent may be obtained for five cents each, by addressing the "Commissioner of Patents, Washington, D. C."